(12) United States Patent
Fujibayashi et al.

(10) Patent No.: US 8,243,572 B2
(45) Date of Patent: Aug. 14, 2012

(54) DISK CONTROLLER AND STORAGE SYSTEM

(75) Inventors: Akira Fujibayashi, Sagamihara (JP); Shuji Nakamura, Machida (JP); Hajime Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1238 days.

(21) Appl. No.: 12/019,961

(22) Filed: Jan. 25, 2008

(65) Prior Publication Data

US 2009/0135698 A1 May 28, 2009

(30) Foreign Application Priority Data

Nov. 28, 2007 (JP) .................................. 2007-307185

(51) Int. Cl.
*G11B 20/00* (2006.01)
(52) U.S. Cl. .................................. 369/53.45; 369/30.01
(58) Field of Classification Search ........................ None
See application file for complete search history.

(56) References Cited

U.S. PATENT DOCUMENTS

| 6,094,725 A | * | 7/2000 | Hiyoshi et al. | ................. 713/340 |
| 2007/0214318 A1 | * | 9/2007 | Abe et al. | ....................... 711/114 |

FOREIGN PATENT DOCUMENTS

JP 07-152495 6/1995

* cited by examiner

*Primary Examiner* — Paul Huber
(74) *Attorney, Agent, or Firm* — Antonelli, Terry, Stout & Kraus, LLP.

(57) ABSTRACT

Proposed is a disk controller capable of notifying that a hard disk drive needs to be replaced even when the power of such hard disk drive is turned off. When a controller is to control the supply of electrical power to a disk in the respective disk units, the controller turns off a green LED and turns on a red LED when a disk in a disk group becomes a replacement target disk, turns off the power of the replacement target disk by opening a power switch corresponding to the respective replacement target disks, turns on the disk power source by closing the power switch when the replacement target disk is replaced with a new disk, and recognizes information concerning the new disk.

10 Claims, 12 Drawing Sheets

FIG.10

| # | DEV ID | RG (REDUNDANT RG) | CHASSIS ID | SLOT POSITION | FAILURE INFORMATION | STATUS DISPLAY | COMMAND INFORMATION | RG OPERATION STATUS | USAGE SCHEDULE | TEST SCHEDULE | REBUILD SCHEDULE |
|---|---|---|---|---|---|---|---|---|---|---|---|
| 0 | 1 | 0 | 0 | A | Norm | NORMAL | - | ON | 9/21 | 9/21 | - |
| 1 | 2 | 0 | 0 | B | Norm | NORMAL | - | ON | 9/21 | 9/21 | - |
| 2 | 3 | 0 | 0 | C | Norm | NORMAL | - | ON | 9/21 | 9/21 | - |
| 3 | 4 | 0 | 0 | D | Norm | NORMAL | - | ON | 9/20 | 9/19 | - |
| 4 | 15 | 6 | 2 | G | Norm | NORMAL | - | OFF | 9/20 | 9/19 | - |
| 5 | 16 | 6 | 2 | H | NG | REPLACEMENT COMMAND | YES | OFF | 9/20 | 9/18 | 9/18 |
| 6 | 20 | 9 | 4 | J | NG | REMOVAL DETECTED | NO | OFF | 9/20 | 9/18 | 9/18 |
| 7 | 21 | 9 | 4 | K | ... | ... | ... | ... | ... | ... | ... |
| ... | ... | ... | ... | ... | | | | | | | |

T2
300 302 304 306 308 310 312 314 316 318 320

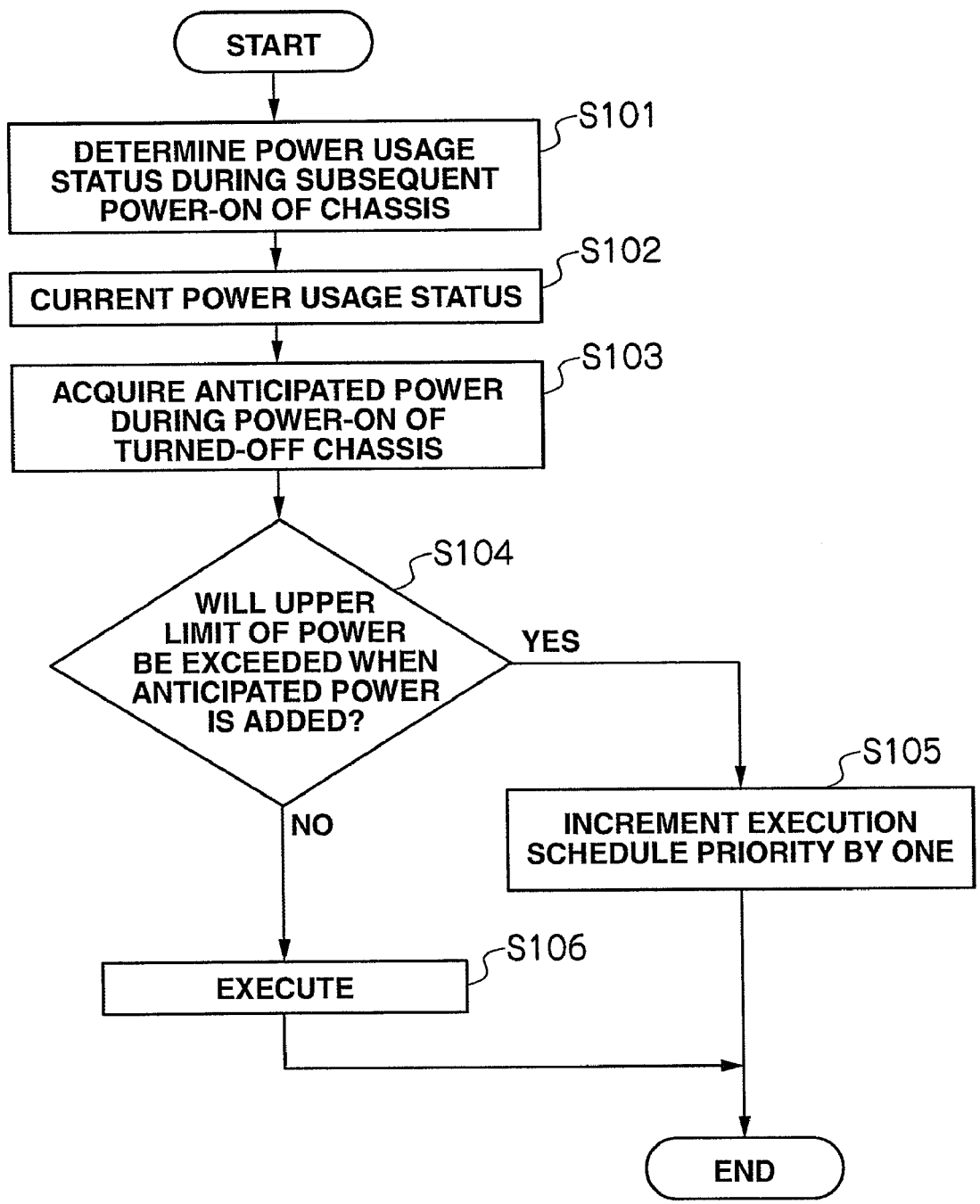

DISK CONTROLLER AND STORAGE SYSTEM

CROSS REFERENCES

This application relates to and claims priority from Japanese Patent Application No. 2007-307185, filed on Nov. 28, 2007, the entire disclosure of which is incorporated herein by reference.

BACKGROUND

The present invention relates to a disk controller and a storage system for controlling the drive of a hard disk drive (HDD) as a storage device.

A storage system, for instance, is configured from a disk controller and the like, and a disk controller is configured by arranging a plurality of storage devices in an array. This type of disk controller provides a storage area based on RAID (Redundant Arrays of Inexpensive Disks) or the like.

A plurality of logical volumes (logical units) are formed in the physical storage area provided by the storage device group, and these logical volumes are provided to a host computer or a server. The host computer or the server is able to write and read data into and from the logical volumes by sending prescribed commands.

Meanwhile, when a hard disk drive is subject to a failure and a need arises to replace such hard disk drive, the hard disk drive is replaced on the condition that the power of the disk chassis and the power of the disk drive are on.

In other words, upon replacing a hard disk drive, the hard disk drive to be replaced is shut down in a status where the power of the hard disk is on while the power of the disk chassis is constantly on, the power of the disk drive to be replaced is turned off (provided that the chassis power supply is left as is), the power of the disk drive is turned on after replacing the defective disk drive with a new disk drive, and procedures for recovering data in the replaced disk are performed. The rebuild processing of data of the hard disk drive that was replaced as a result of failure is performed in parallel with the replacement operation by using a spare disk drive or, if there is no spare disk drive, performed by executing data recovery processing after the replacement of the defective hard disk drive (for instance, refer to Japanese Patent Laid-Open Publication No. 7-152495).

SUMMARY

During the maintenance of hard disk drives in conventional technology, since a hard disk drive is replaced in a status where the power of the disk drive chassis and the power of the hard disk drive are on, electrical power will be consumed needlessly. If the power of the disk chassis and the hard disk drive is turned off before completing the shut-down processing, it will not be possible to notify the maintenance worker that the hard disk drive needs to be replaced.

In addition, even in cases where the power of the hard disk drive or the power of the disk chassis is turned off as a result of these components not being used for a long period of time by a server or application, when the hard disk drive is subject to a failure, it is necessary to turn on the power of the disk chassis, replace the defective hard disk drive, and keep the power of the disk chassis and the hard disk drive turned on in order to rebuild the data concerning the replaced hard disk drive even if there is no urgency. Thus, power consumption will increase in a needless timing and timeframe.

Moreover, if the power of the defective hard disk drive and the disk chassis is kept turned on, it is anticipated that there will be computer centers where the electrical power of the overall disk controller will exceed the upper limit of the power supply, or which will not be able to turn on the power of IT devices at once pursuant to the increase in power consumption of future IT devices. Thus, it is not possible to sufficiently and smoothly perform the power saving control of disk controllers.

Meanwhile, if the power of the defective hard disk drive or the power of the disk chassis is turned off for power saving, it will not be possible to recognize that the hard disk drive has been removed from the slot or that the hard disk drive has been replaced. Further, it is possible that the rebuild processing of data could be executed based on a wrong hard disk drive.

The present invention was made in view of the foregoing problems of conventional technology. Thus, an object of this invention is to provide a disk controller and a storage system capable of notifying that a hard disk drive needs to be replaced even when the power of such hard disk drive is turned off.

In order to achieve the foregoing object, when a hard disk drive among a plurality of hard disk drives is subject to a failure and becomes a replacement target, the present invention turns off the disk power source corresponding to the replacement target hard disk drive, and changes the display mode of the indicator for displaying the status of the replacement target hard disk from a first status to a second status upon receiving supply of electrical power from a power source that is different from the foregoing disk power source so as to notify that a hard disk drive among a plurality of hard disk drives needs to be replaced.

According to the present invention, even in a status where the power of the hard disk drive and the disk chassis is turned off, it is possible to notify the hard disk drive that needs to be replaced, notify that an operation such as the removal of the hard disk drive to be replaced took place, and notify that the power of components including the disk chassis has been turned off.

DESCRIPTION OF DRAWINGS

FIG. 10 is a configuration diagram of the respective storage device management tables;

FIG. 12 is a flowchart explaining the second embodiment of a rebuild schedule.

DETAILED DESCRIPTION

Figure 1:
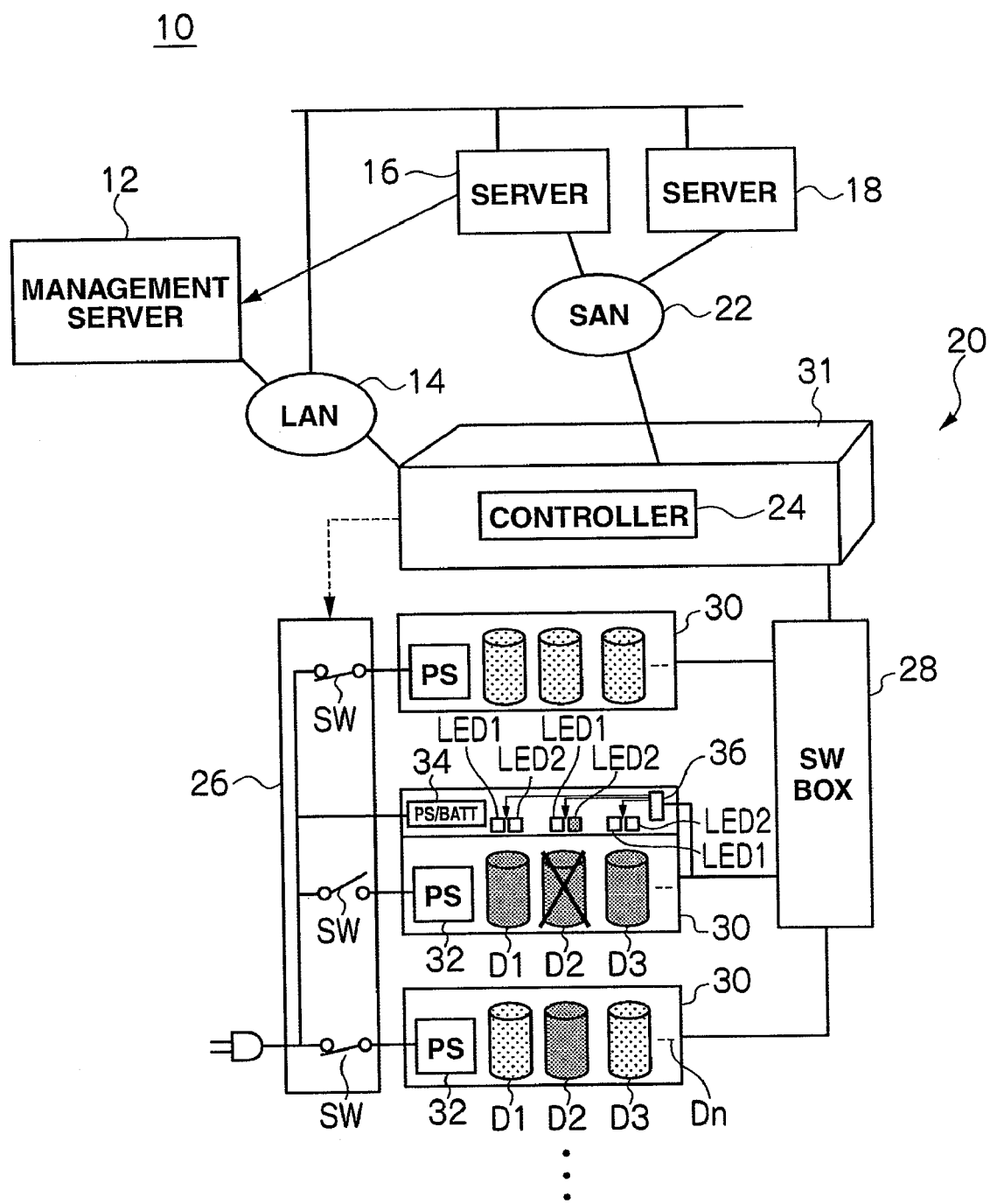
FIG. 1 is a block configuration diagram of a storage system according to an embodiment of the present invention

An embodiment of the present invention is now explained with reference to the attached drawings. FIG. 1 is a block configuration diagram of a storage system according to the present invention. In FIG. 1, a storage system 10 comprises a management server 12 as a management unit, and the management server 12, for instance, is connected to a communication network 14 configured from a LAN (Local Area Network), the communication network 14 is connected to servers 16, 18 for sending and receiving information to and from the management server 12, and connected to a disk controller 20. The disk controller 20 is connected to the servers 16, 18 via a communication network 22 configured from a SAN (Storage Area Network).

The disk controller 20 comprises a controller 24, a power supply box 26, a switch box 28, and a disk unit 30 mounted with one or more disk drives #1 to #n, and the controller 24 is housed in a chassis 31.

The controller 24, for example, comprises a microprocessor, a memory, an I/O interface circuit and the like, and sends and receives data to and from the management server 12 via the communication network 14, sends and receives data to and from the servers 16, 18 via the communication network 22, accesses the respective disk drives in the respective disk units 30 via the switch box 28, and controls the supply of power to the respective disk units 30 via the power supply box 26.

Each disk unit 30 comprises an electrical power converter 32, a plurality of hard disk drives (HDDs; hereinafter simply referred to as "disks") D1, D2, D3 ... Dn, an auxiliary power 34, a green light-emitting diode LED 1 and a red light-emitting diode LED 2, a selector 36 for selecting the green light-emitting diode LED 1 and the red light-emitting diode LED 2, a management means 50, and a connecting means 51.

The connecting means 51 may be a switch, or more specifically a Fibre Channel loop switch, a SAS (Serial Attached SCSI) Expander, or a Serial ATA port multiplier. The connecting means 51 is a means for connecting and communicating access signals from the switch box 28 to a plurality of disk drives in the disk unit.

Each electrical power converter 32 is connected to an external power source via a power switch SW in the power supply box 26, and is able to convert AC power from the external power source into DC power, and drive the disks D1 to Dn of the respective disk units 30. In other words, each power switch SW and each electrical power converter 32 are configured as the power source to the respective disk units 30, configured as the drive power (disk power source) of the disks D1 to Dn removably arranged in the slot of the units, and also configured as the power source of the connecting means 51 of the units. Each power switch SW opens and closes according to the signal from the controller 24.

The auxiliary power 34, for example, is configured from an electrical power converter or a battery connected directly to an external power source, and supplies necessary power to the management means 50 and the detector 38, and supplies power to the green light-emitting diode LED 1 and the red light-emitting diode LED 2. In other words, [the auxiliary power 34] is a means for supplying power and operating the components independently from the disk drives in the disk unit and the connecting means 51.

The green light-emitting diode LED 1 and the red light-emitting diode LED 2 are configured as an indicator arranged in correspondence with respective disks D1 to Dn, and are turned on upon receiving supply of electrical power from the auxiliary power 34 that is different from the disk power source of the respective disks D1 to Dn. For example, when the respective disks D1 to Dn are of a normal status, the green light-emitting diode LED 1 is turned on as the first status, and, for instance, when the disk D2 of the #2 disk unit 30 is subject to a failure, the red light-emitting diode LED 2 corresponding to the replacement target disk D2 is turned on as the second status in order to urge the replacement of the disk D2. In addition, when the replacement target disk D2 is removed from the slot, both the green light-emitting diode LED 1 and the red light-emitting diode LED 2 are turned on as the third status.

In other words, the indicator configured from the green light-emitting diode LED 1 and the red light-emitting diode LED 2 changes the display mode according to the status of the respective disks D1 to Dn. For example, the indicator illuminates in green as the first status when the respective disks D1 to Dn are of a normal status, illuminates in red by changing from the first status to the second status when a failure occurs in any one of the disks, and illuminates in both red and green as the third status when the replacement target disk is removed from the slot.

The LED can also be controlled by the management means 50 based on a signal from the detector 38. In particular, when the replacement target disk D2 is removed from the slot, there is also an embodiment of simply illuminating both the green light-emitting diode LED 1 and the red light-emitting diode LED 2 as the third status based on the change in signal from the detector 38 or change in status of insertion or deletion. Nevertheless, in the ensuing explanation, let it be assumed that, as a general rule, the foregoing illumination is controlled by the controller 24 as a result of the detected information being notified to the controller 24.

Figure 2:
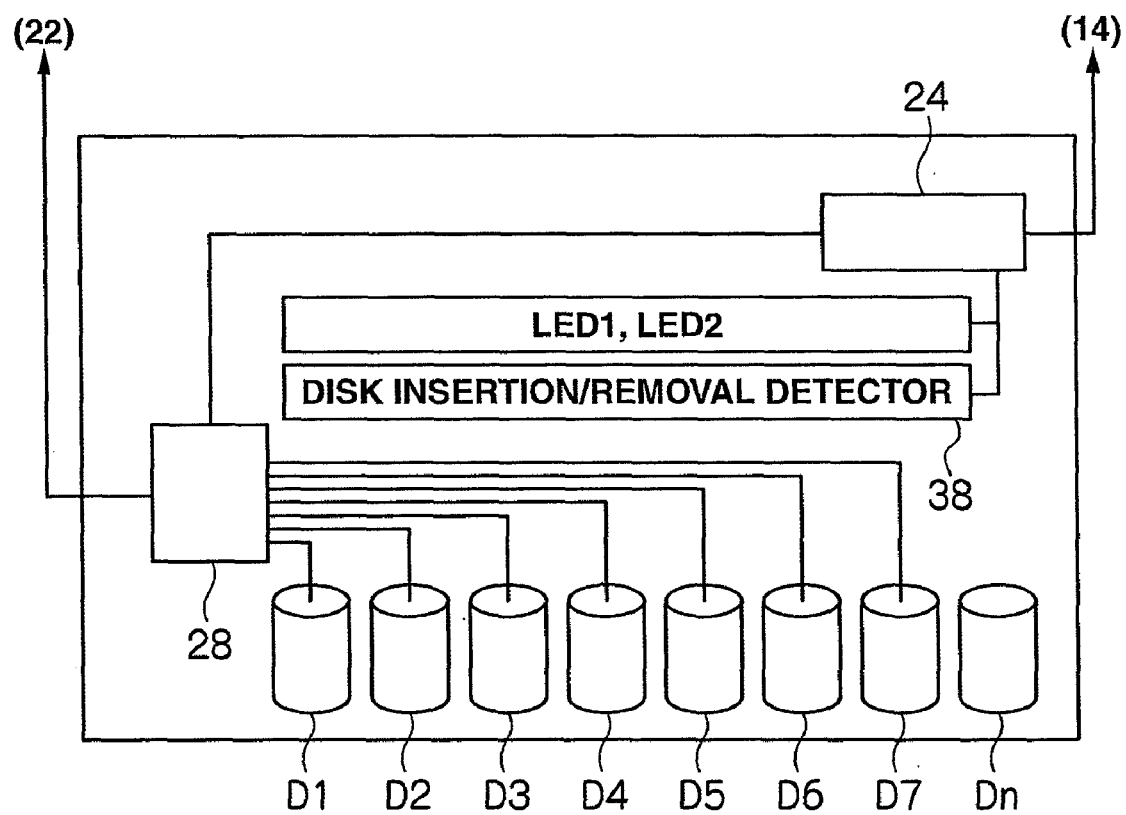
FIG. 2 is a block configuration diagram of a disk controller.

In order to detect that one of the disks in the disk group arranged removably in the slot has been replaced, as shown in FIG. 2, provided is a disk insertion/removal detector 38 for detecting that the replacement target disk has been removed from the slot and that a new disk has been inserted into the slot.

Figure 3:
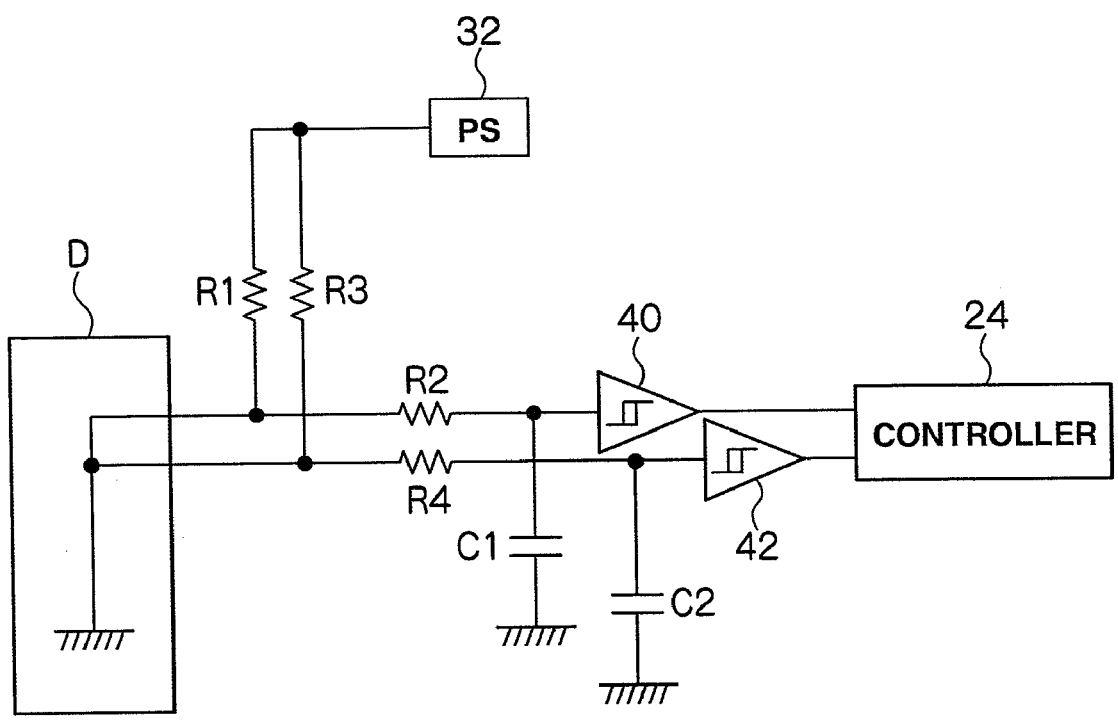
FIG. 3 is a circuit configuration diagram of a disk insertion/removal detector.

Specifically, as shown in FIG. 3, the disk insertion/removal detector 38 comprises resistances R1, R2, R3, R4, capacitors C1, C2, and schmitt trigger circuits 40, 42, and is arranged in correspondence with the respective disks. The connection point of the resistance R1 and the resistance R2 and the connection point of the resistance R3 and the resistance R4 are respectively grounded via the disk inserted into the slot (not shown).

When a disk is not inserted into the slot, the connection point of the resistance R1 and the resistance R2 and the connection point of the resistance R3 and the resistance R4 are respectively not grounded, and the output voltage of the electrical power converter 32 is divided with the resistance R1 and the resistance R2, and divided with the resistance R3 and the resistance R4, and the respective divided voltages V1, V2 are applied to the schmitt trigger circuits 40, 42 via the capacitors C1, C2. Here, high-level signals are respectively output from the schmitt trigger circuits 40, 42 to the management means 50, and additionally output from the management means 50 to the controller 24 as signal detection information from the detector.

When a disk is inserted into the slot in the foregoing status, the connection point of the resistance R1 and the resistance R2 and the connection point of the resistance R3 and the resistance R4 are both grounded, the output level of the schmitt trigger circuits 40, 42 is inverted from a high level to a low level pursuant to the reduction in the input voltage, and this low level is output to the management means 50. Thereby, the management means 50 is able to detect that a disk has been inserted into the slot as a result of the output level of the schmitt trigger circuits 40, 42 being inverted from a high level to a low level.

Meanwhile, when the disk is removed from the slot, since the grounding by the disk is cancelled and the input voltage of the schmitt trigger circuits 40, 42 will increase, the output level of the schmitt trigger circuits 40, 42 is inverted from a low level to a high level, and this high level is output to the management means 50. Thereby, the management means 50 is able to detect that a disk has been removed from the slot as a result of the output level of the schmitt trigger circuits 40, 42 being inverted from a low level to a high level.

The management means 50 receives the ON/OFF control of the LED and a detection signal from the detector 38, and sends information based on the detection signal from the detector [38] to the controller 24. The configuration may also be such that the controller 24 accesses the management means 50 in given intervals to acquire information. The communication means in the foregoing cases may be a LAN, or a low-speed communication means such as an I2C, or simply a level signal, and any such communication means will suffice so as long as it is provided between the management means 50 and the controller 24.

In addition, a communication means may be provided through the switch box 28 (access means to the disk drive of the controller 24). In this case, the communication means exists between the management means 50 and the switch box 28.

Figure 4:
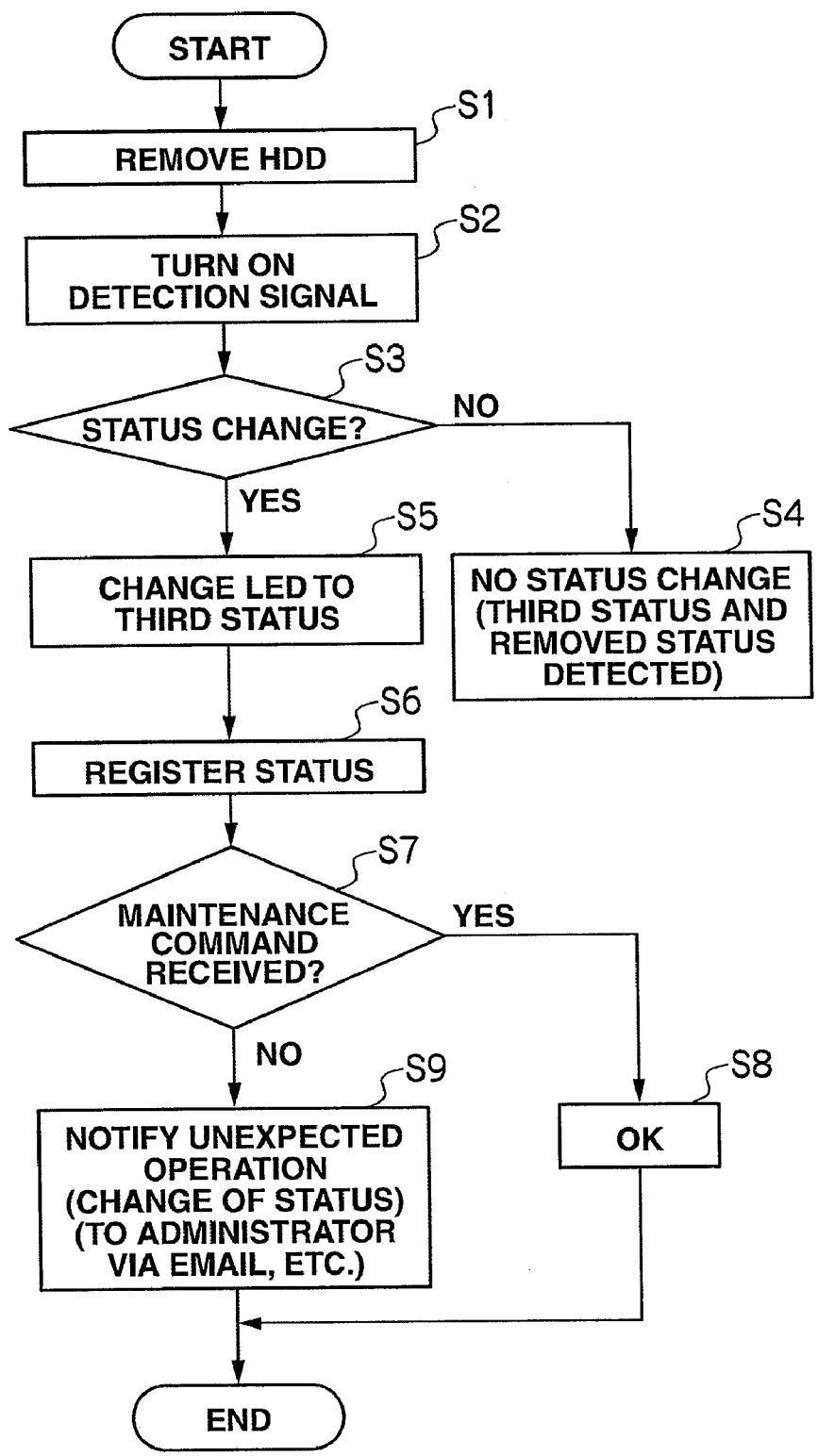
FIG. 4 is a flowchart explaining status detection and notification determination processing when a disk is removed.

The processing to be performed when the disk is removed from the slot is now explained with reference to the flowchart of FIG. 4. For example, when a failure occurs in the disk D2 of the #2 disk unit 30 and the replacement target disk D2 is foremost removed from the slot (S1), a detection signal based on the detection of the disk insertion/removal detector 38 corresponding to the replacement target disk D2 is output to the management means 50.

In addition, information notifying that a status change detection signal has been received from the detector 38 is output from the management means 50 to the controller 24 via the communication means (S2). Subsequently, the controller 24 determines whether the status has changed based on the information from the management means 50 (S3) and, when the status has not changed; that is, since the light-emitting diodes LED 1, LED 2 are already in a third status indicating no change in the status, ends the processing of this routine (S4).

Meanwhile, when the controller 24 determines that the status has changed, it turns on both light-emitting diodes LED 1, LED 2 in order to change the display mode of the indicator to a third status (S5), and registers this status in a memory or a table (S6). The controller 24 thereafter determines whether a maintenance command was issued from the management server 12 or the other server 16, 18 (S7) and, when a maintenance command has been issued, ends the processing of this routine since this implies that the removal of the disk D2 was normal (S8).

Meanwhile, when the controller 24 determines that a maintenance command has not been issued, it notifies the management server 12 or the other server 16, 18 that the disk D2 was removed from the slot according to an unexpected operation; for instance, an unauthorized removal, and then ends the processing of this routine (S9).

Like this, when the disk D2 in the disk group becomes the replacement target disk D2, the light-emitting diode LED 1 among the indicators corresponding to the disk D2 is turned off, the light-emitting diode LED 2 is illuminated in red, and a message indicating that the disk D2 is the replacement target disk D2 is displayed. When the disk D2 is removed from the slot, the display mode of the indicator corresponding to the disk D2 changes to a third status, both light-emitting diodes LED 1 and LED 2 are turned on, and this status is notified to the controller 24 through the management means 50 and registered by the controller 24 and notified to the management server 12 or the servers 16, 18.

According to the present embodiment, when the disk D2 in the disk group becomes the replacement target disk D2, since the light-emitting diode LED 1 among the indicators corresponding to the disk D2 is turned off, the light-emitting diode LED 2 is illuminated in red, and a message indicating that the disk D2 is the replacement target disk D2 is displayed, even if the disk power source is turned off, it is possible to notify the maintenance worker that there is a replacement target disk D2.

Further, according to the present embodiment, when the disk D2 is removed from the slot, since the display mode of the indicator corresponding to the disk D2 changes to a third status, both light-emitting diodes LED 1 and LED 2 are turned on, and this status is registered by the controller 24 and notified to the management server 12 or the servers 16, 18, it is possible to notify the maintenance worker that the replacement target disk D2 has been removed from the slot.

Figure 5:
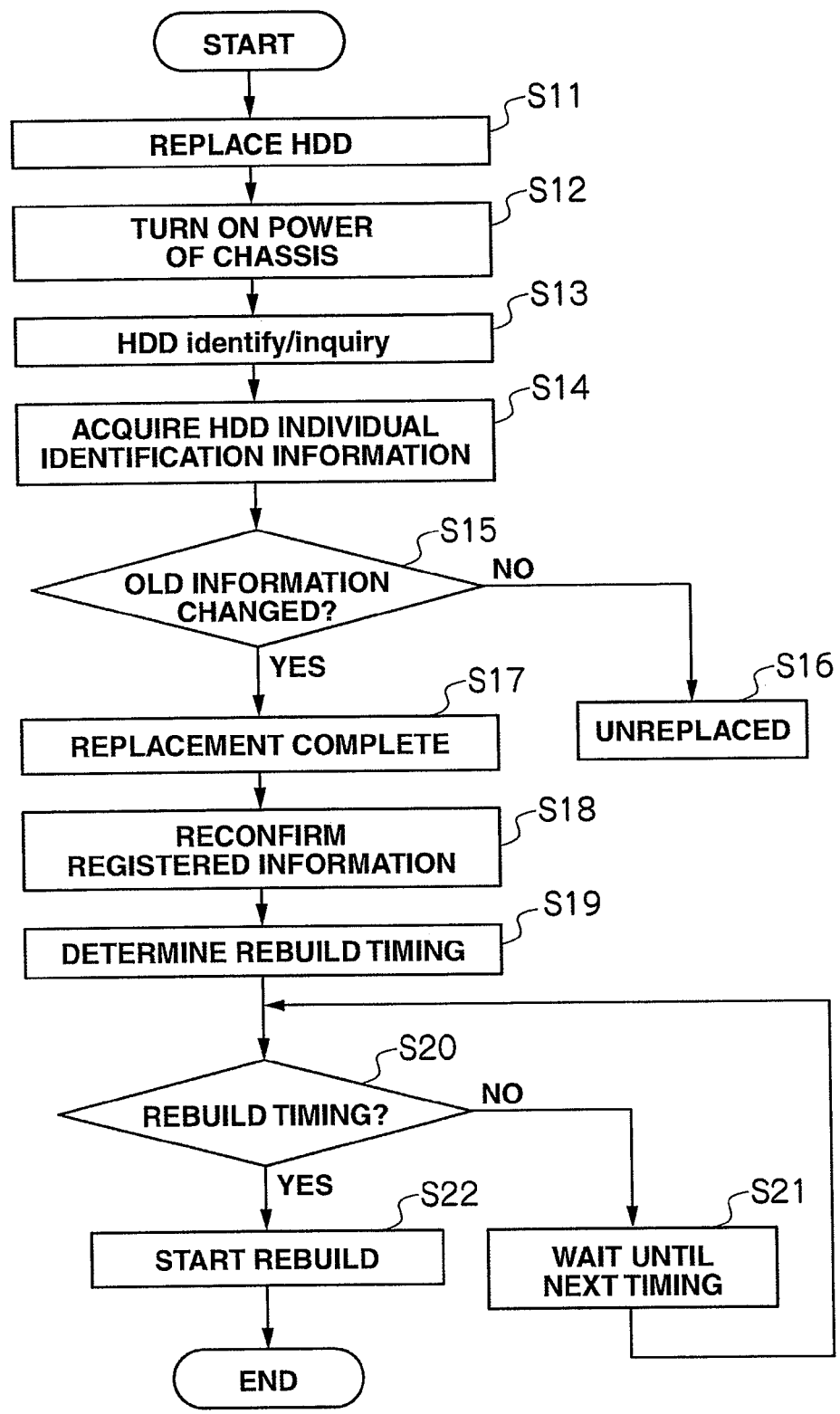
FIG. 5 is a flowchart showing the first embodiment of the replacement disk determination routine.

The first embodiment of the replacement disk determination routine is now explained with reference to the flowchart of FIG. 5. This processing, for instance, is started when a failure occurs in the disk D2 of the #2 disk unit 30, the replacement target disk D2 is removed from the slot, the replacement target disk D2 is replaced with a new disk (S11), and the output level of the disk insertion/removal detector 38 is thereby inverted from a low level to a high level.

Subsequently, when the controller 24 recognizes that the replacement target disk D2 has been replaced with a new disk D2 according to the information from the management means 50 based on the detection signal of the disk insertion/removal detector 38, it closes the power switch SW corresponding to the new disk D2, and supplies the electrical power from the external power source to the power source of the #2 disk unit 30 via the electrical power converter 32 (S12). Here, the controller 24 turns off the LED 2 and illuminates the LED 1 in green through the management means 50 in order to return the display mode of the indicator corresponding to the new disk D2 to the first status pursuant to the disk power source being turned on.

Subsequently, the controller 24 sends and receives data to and from the new disk D2 via the switch box 28 and the connecting means 51, imports data such as "identify" and "inquiry" concerning the new disk D2 (S13), and acquires the individual identifying information concerning the new disk D2 (S14). The controller 24 thereafter compares the information of the replacement target disk D2 and the information of the new disk D2, determines whether the old information has changed (S15), and, when it is determined that the old information has not changed, ends the processing of this routine since this implies that the replacement target disk D2 has not been replaced (S16).

Meanwhile, when it is determined that the old information has changed, the controller 24 determines that the replacement target disk D2 has been replaced with a new disk D2 (S17), and performs processing for reconfirming the information concerning the new disk D2 (S18). In order to reconfirm the registered information, the controller 24 reconfirms the information associated with the removal of the replacement target disk D2 or the registered information of the maintenance worker.

Subsequently, the controller 24 decides the rebuild timing for rebuilding data concerning the new disk D2 (S19), determines whether it is the determined timing (S20), and, when it is not the determined timing, waits for the next timing, and then returns to the processing at step S20 (S21). Meanwhile, when it becomes the determined timing, [the controller 24] starts the processing for rebuilding data concerning the new disk D2, and then ends the processing of this routine (S22).

According to the present embodiment, when information of the replacement target disk D2 and information of the new disk D2 are compared based on data such as "identify" or "inquiry" concerning the new disk D2 and the replacement of the replacement target disk D2 with a new disk D2 is recognized, it is possible to rebuild data concerning the new disk D2 at a determined timing.

Figure 6:
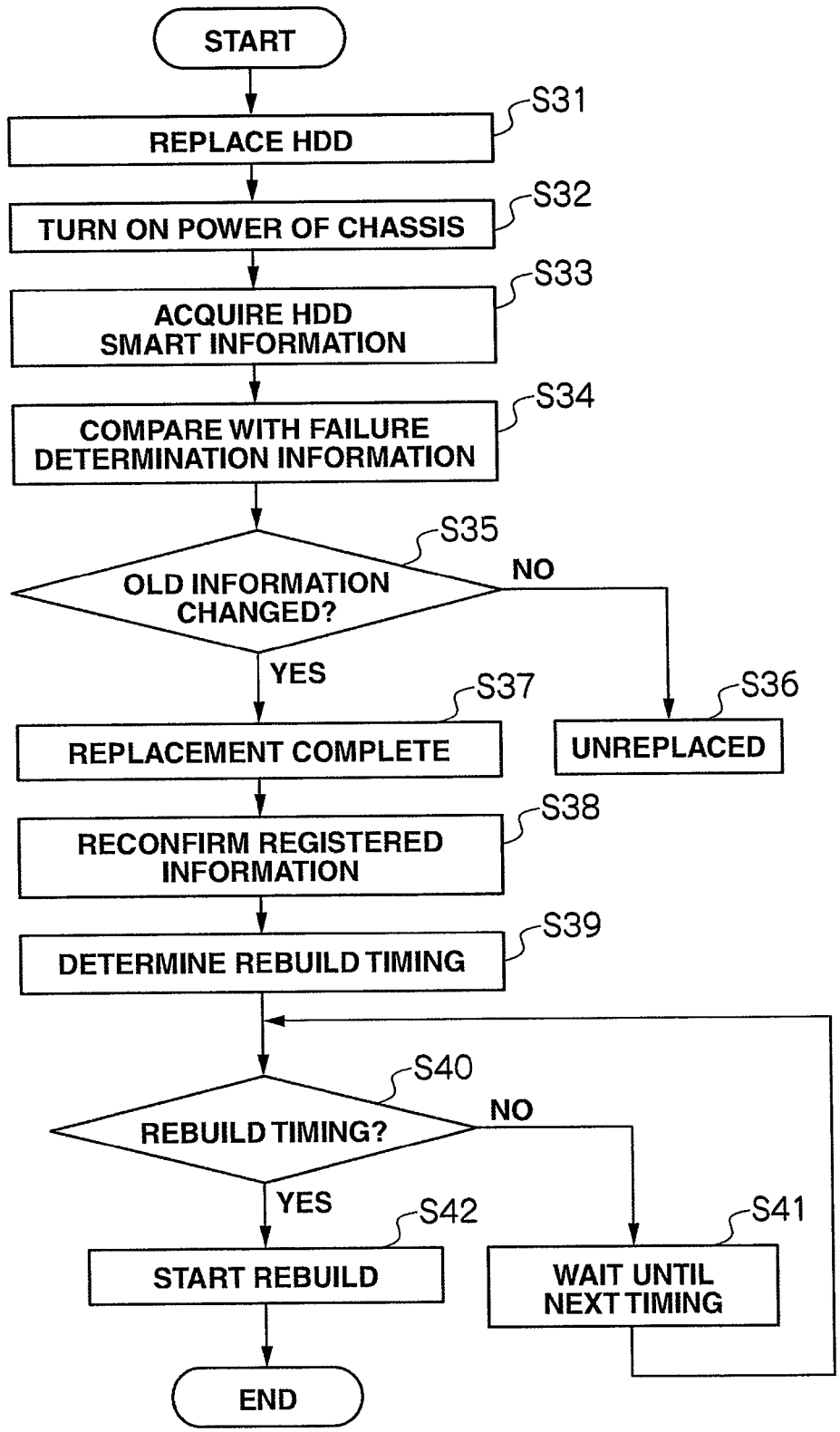
FIG. 6 is a flowchart showing the second embodiment of the replacement disk determination routine.

The second embodiment of the replacement disk determination routine is now explained with reference to FIG. 6. In this replacement disk determination routine, processing is performed such that the disk power source is turned on after the replacement target disk D2 is replaced with the new disk D2, the display mode of the indicator is returned to the first display mode (S31, S32), smart information as information concerning the new disk D2 is thereafter acquired at step S33, and compared with failure determination information at step S34. Nevertheless, the processing from step S35 to step S42 is the same as the processing from step S15 to step S22 shown in FIG. 5.

According to the present embodiment, when information of the replacement target disk D2 and information of the new disk D2 are compared based on the smart information concerning the new disk D2 and the replacement of the replacement target disk D2 with a new disk D2 is recognized, it is possible to rebuild data concerning the new disk D2 at a determined timing.

Figure 7:
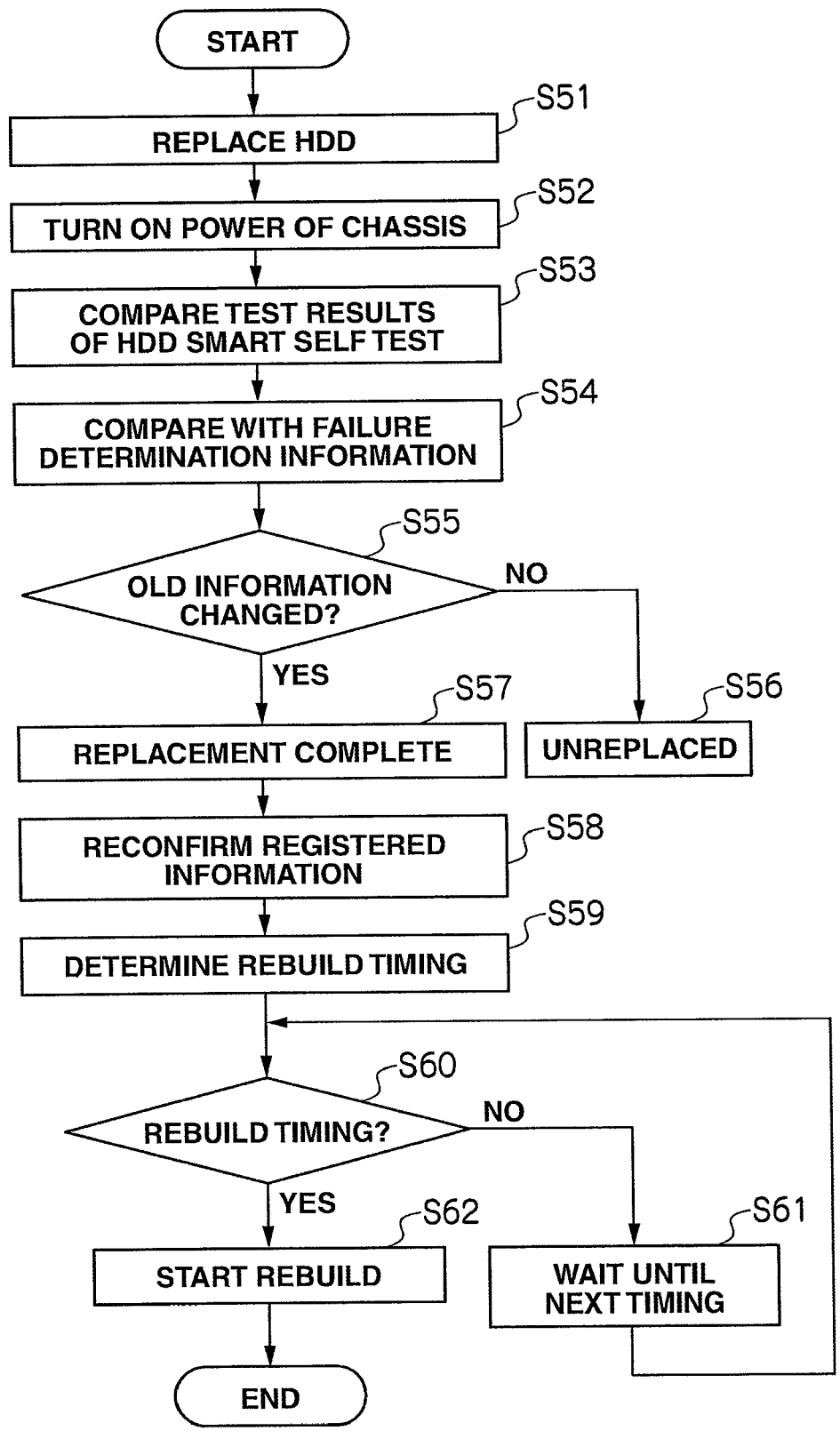
FIG. 7 is a flowchart showing the third embodiment of the replacement disk determination routine.

The third embodiment of the replacement disk determination routine is now explained with reference to the flowchart of FIG. 7. In this replacement disk determination routine, processing is performed such that the disk power source is turned on after the replacement target disk D2 is replaced with the new disk D2, the display mode of the indicator is returned to the first display mode (S51, S52), the test results of the smart self tests concerning the new disk D2 are thereafter compared at step S53, and the test result is compared with the failure determination information at step S54. Nevertheless, the processing from step S55 to step S62 is the same as the processing from step S15 to S22 shown in FIG. 5.

According to the present embodiment, when information of the replacement target disk D2 and information of the new disk D2 are compared based on the test results of the smart self tests concerning the new disk D2 and the replacement of the replacement target disk D2 with a new disk D2 is recognized, it is possible to rebuild data concerning the new disk D2 at a determined timing.

Figure 8:
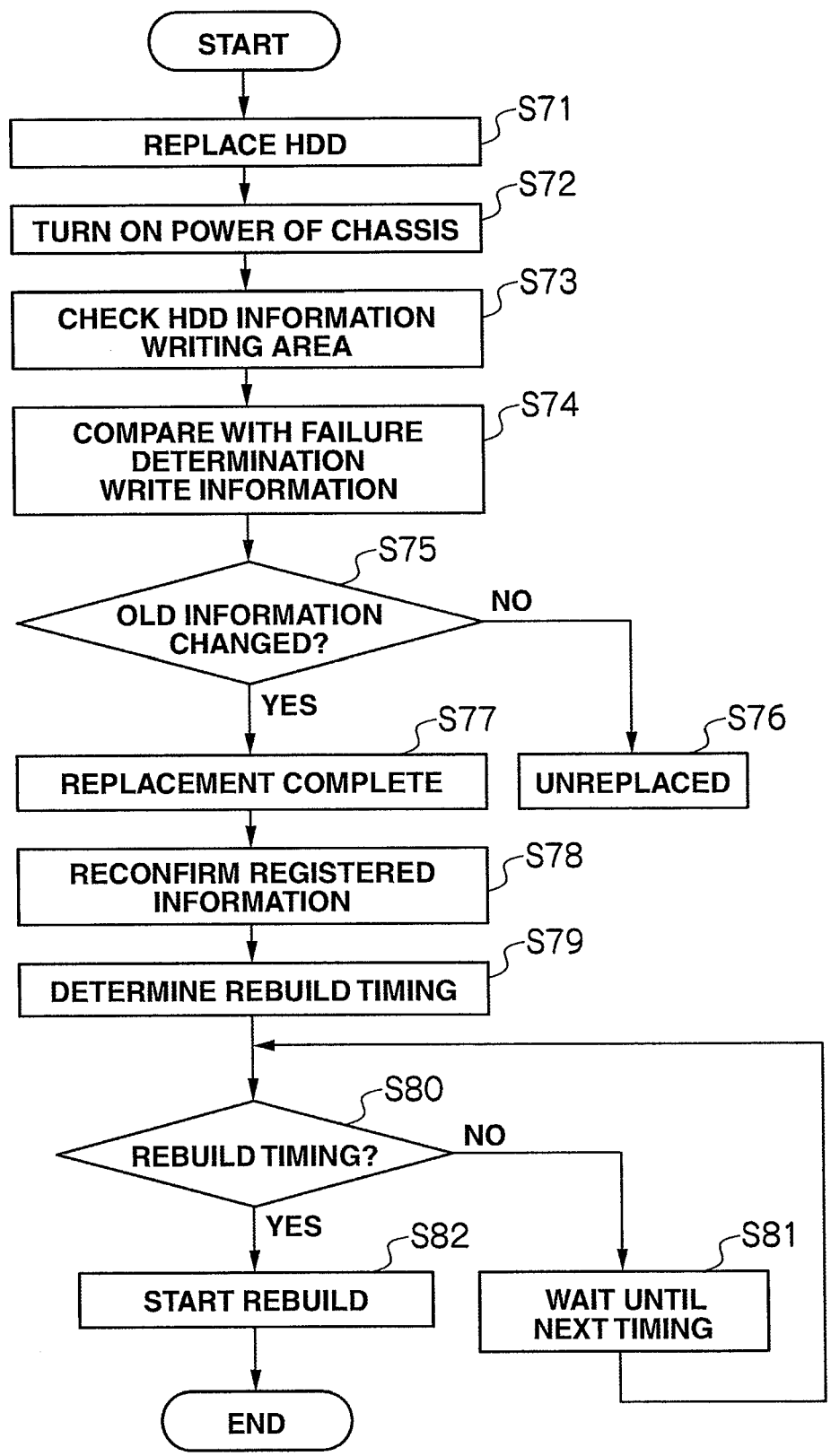
FIG. 8 is a flowchart showing the fourth embodiment of the replacement disk determination routine.

The fourth embodiment of the replacement disk determination routine is now explained with reference to the flowchart of FIG. 8. In this replacement disk determination routine, processing is performed such that the disk power source is turned on after the replacement target disk D2 is replaced with the new disk D2, the display mode of the indicator is returned to the first display mode (S71, S72), the information write area concerning the new disk D2 is checked at step S73, and thereafter compared with the failure determination write information at step S74. Nevertheless, the processing from step S75 to step S82 is the same as the processing from step S15 to step S22 shown in FIG. 5.

According to the present embodiment, when the information write area of the new disk D2 is checked and information of the replacement target disk D2 and information of the new disk D2 are compared based on the results thereof and the replacement of the replacement target disk D2 with a new disk D2 is recognized, it is possible to rebuild data concerning the new disk D2 at a determined timing.

FIGS. 5, 6, 7 and 8 explained a rebuild processing routine after a new disk is replaced and prepared. Generally speaking, if there is a spare disk, such spare disk can be used to perform the rebuild processing independently from the replacement processing.

The sections corresponding to the completion of replacement at steps 17, 37, 57 and 77 in FIGS. 5, 6, 7 and 8 are for comparing the existence of a spare disk, and can make the rebuild processing into an executable status.

Even in the foregoing case, the rebuild processing is actually executed according to a schedule explained later. Since the replacement of disks must also be appropriately executed even when data is to be rebuilt using a spare disk, the disk replacement confirmation step in FIGS. 5, 6, 7 and 8 is required. Nevertheless, this is executed separately from the rebuild processing. In addition, since the chassis power supply must be turned on during the replacement confirmation step, this is executed according to the relationship with the electrical power consumption and usage status as with the determination of the rebuild schedule described later.

Figure 9:
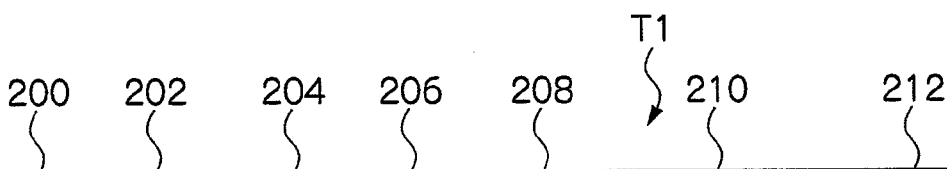
FIG. 9 is a configuration diagram of a device management table.

When rebuilding data concerning the new disk, a device management table T1 shown in FIG. 9 and a device management table T2 shown in FIG. 10 are used. The device management tables T1, T2 are stored in the management server 12, and information concerning the device management tables T1, T2 is transferred to the controller 24 via the communication network 14.

The device management table T1 stores information concerning a logical unit ID number 200, a logical device ID number 202, a physical device ID number 204, a redundant group ID number 206, a chassis ID number 208, a schedule 210, and a priority rebuild 212.

The device management table T2 as a management table for the respective storages stores information concerning a device ID number 300, a redundant group 302, a chassis ID number 304, a slot position 306, failure information 308, a status display 310, command information 312, a redundant operation status 314, a usage schedule 316, a test schedule 318, and a rebuild schedule 320.

Figure 11:
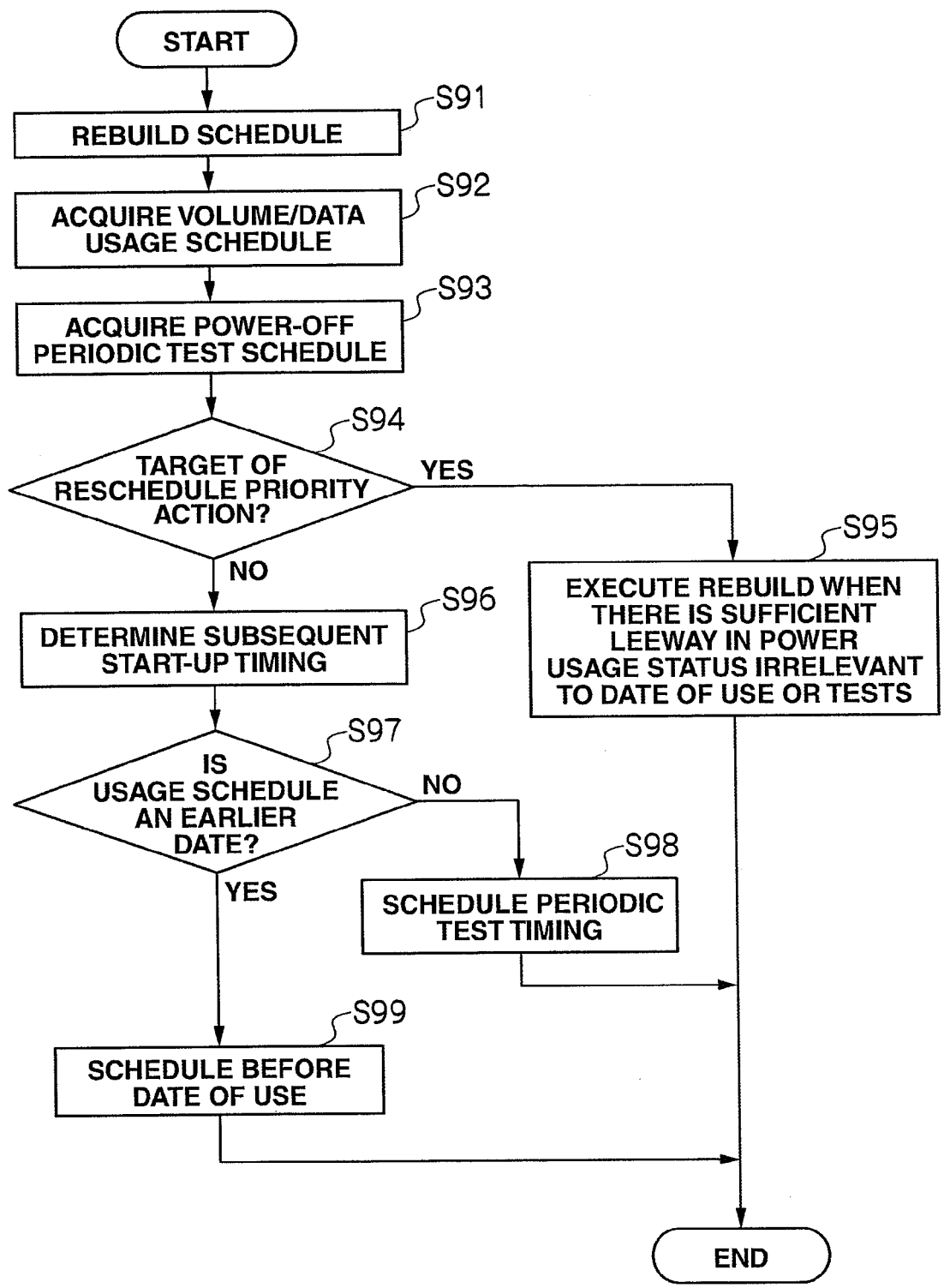
FIG. 11 is a flowchart explaining the first embodiment of a rebuild schedule.

Rebuild schedule processing is now explained with reference to the flowchart of FIG. 11. This processing is executed by the controller 24 based on information transferred from the management server 12. Foremost, the controller 24 refers to the rebuild schedule 320 of the device management table T2 transferred from the management server 12 (S91), acquires information concerning the volume/data usage schedule (S92), thereafter acquires information concerning a power-off periodic test schedule (S93), and determines whether the [rebuild schedule] is the target of reschedule priority processing (S94). If the rebuild schedule is the target of reschedule priority processing, the controller 24 transfers the processing for executing rebuild when there is leeway in the power usage status irrespective of the date of use and tests to the controller 24, and then ends the processing of this routine.

Meanwhile, when it is determined that the rebuild schedule is not the target of reschedule priority processing, the controller 24 determines the subsequent start-up timing (S96), determines whether the usage schedule is an earlier date (S97), and, when the usage schedule is not an earlier date, executes the schedule according to the periodic test timing (S98). Contrarily, if it is determined that the usage schedule is an earlier date, [the controller 24] performs processing for executing the schedule before the date of use (S99), and then ends the processing of this routine.

According to the present embodiment, [the controller 24] determines whether the rebuild schedule is the target of reschedule priority processing, and, when it is the target of priority processing, it is possible to rebuild data when there is leeway in the power usage status irrespective of the date of use and tests, and, when it is not the target of priority processing, it is possible to rebuild data according to the usage schedule.

Another embodiment of the rebuild schedule is now explained with reference to the flowchart of FIG. 12. This rebuild schedule is executed by the processing of the controller 24 based on information transferred from the management server 12.

Foremost, the controller 24 starts the processing for determining the power usage status during the subsequent power-on of the chassis (S101), performs processing for comprehending the current power usage status concerning the disk controller 20 (S102), acquires the anticipated electrical power during the power-on of the turned-off chassis (disk power source) (S103), determines whether the upper limit of the electrical power will be exceeded when the anticipated electrical power is added (S104), performs processing for incrementing the execution schedule priority by one when the upper limit is exceeded (S105), performs processing for executing the rebuild schedule when the upper limit is not exceeded (S106), and then ends the processing of this routine.

According to the foregoing embodiments, since [the controller 24] estimates the power usage status during the subsequent disk power-on, and executes processing for rebuilding data concerning the new disk under the condition that the electrical power during the subsequent disk power-on will not exceed the upper limit even when the anticipated electrical power is added, it is possible to control the electrical power of the disk controller 20 in a stable condition.

What is claimed is:

1. A disk controller, comprising:
    a plurality of disks as a storage device arranged removably in a slot;
    a plurality of disk power sources for driving each of said disks upon receiving supply of electrical power from an external power source; and
    a controller for accessing each of said disks;
    wherein [said disk controller] further comprises a plurality of indicators for displaying the status of each of said disks upon receiving supply of electrical power from a power that is different from each of said disk power sources; and
    wherein said controller monitors the status of each of said disks and controls each of said disk power sources and each of said indicators according to the monitoring result, and, when any one of said plurality of disks becomes a replacement target disk, turns off the disk power source corresponding to said replacement target disk, and changes the display mode of the indicator corresponding to said replacement target disk from a first status to a second status.

2. The disk controller according to claim 1, further comprising a disk insertion/removal detector for detecting that said replacement target disk has been removed from said slot;
    wherein said controller changes the display mode of the indicator corresponding to said replacement target disk from said second status to a third status in response to a detection signal of said disk insertion/removal detector.

3. The disk controller according to claim 1,
    wherein, when said replacement target disk is replaced with a new disk, said controller turns on the disk power source corresponding to said new disk, returns the display mode of the indicator corresponding to said new disk to said first status, acquires information from said new disk and recognizes the contents thereof, and executes processing associated with the replacement of said replacement target disk according to the recognition result.

4. The disk controller according to claim 1,
    wherein, when said replacement target disk is replaced with a new disk, said controller turns on the disk power source corresponding to said new disk, returns the display mode of the indicator corresponding to said new disk to said first status, acquires information from said new disk and recognizes the contents thereof, and executes processing for rebuilding data concerning said new disk based on the recognition result.

5. A storage system that connects a server system including a plurality of servers and a plurality of disk controllers via a communication network, and sends and receives commands between said server system and said plurality of disk controller with said communication network as the information transmission medium;
    wherein each of said disk controllers comprises:
    a plurality of disks as a storage device for storing data arranged removably in a slot;
    a plurality of disk power sources for driving each of said disks upon receiving supply of electrical power from an external power source;
    a plurality of indicators for displaying the status of each of said disks upon receiving supply of electrical power from a power that is different from each of said disk power sources; and
    a controller for accessing each of said disks, and monitoring the status of each of said disks and controlling each of said disk power sources and each of said indicators according to the monitoring result;
    wherein, when any one of said plurality of disks becomes a replacement target disk, said controller turns off the disk power source corresponding to said replacement target disk, and changes the display mode of the indicator corresponding to said replacement target disk from a first status to a second status.

6. The storage system according to claim 5, further comprising a disk insertion/removal detector for detecting that said replacement target disk has been removed from said slot;
    wherein said controller changes the display mode of the indicator corresponding to said replacement target disk from said second status to a third status in response to a detection signal of said disk insertion/removal detector.

7. The storage system according to claim 5,
    wherein, when said replacement target disk is replaced with a new disk, said controller turns on the disk power source corresponding to said new disk, returns the display mode of the indicator corresponding to said new disk to said first status, acquires information from said new disk and recognizes the contents thereof, and executes processing associated with the replacement of said replacement target disk according to the recognition result.

8. The storage system according to claim 5,
    wherein, when said replacement target disk is replaced with a new disk, said controller turns on the disk power source corresponding to said new disk, returns the display mode of the indicator corresponding to said new disk to said first status, acquires information from said new disk and recognizes the contents thereof, and transfers the recognition result to a management server among said servers.

9. The storage system according to claim 5,
wherein, when said replacement target disk is replaced with a new disk, said controller turns on the disk power source corresponding to said new disk, acquires information from said new disk and recognizes the contents thereof, and executes processing for rebuilding data concerning said new disk based on the recognition result according to a schedule.

10. The storage system according to claim 5,
wherein, when said replacement target disk is replaced with a new disk, said controller turns on the disk power source corresponding to said new disk, acquires information from said new disk and recognizes the contents thereof, estimates the power usage status during the subsequent disk power-on based on the recognition result, and executes processing for rebuilding data concerning said new disk under the condition that the electrical power during the subsequent disk power-on will not exceed the upper limit even when the anticipated electrical power is added.

* * * * *